(12) United States Patent
Sherwin et al.

(10) Patent No.: US 8,468,563 B1
(45) Date of Patent: Jun. 18, 2013

(54) METHOD FOR INGESTING MULTIPLE SIGNALS OF THE SAME MEANING

(75) Inventors: Jeffrey Sherwin, Scarsdale, NY (US); Nickolas James Heudecker, San Jose, CA (US)

(73) Assignee: This Technology, Inc., Denver, CO (US)

( * ) Notice: Subject to any disclaimer, the term of this patent is extended or adjusted under 35 U.S.C. 154(b) by 0 days.

(21) Appl. No.: 13/459,385

(22) Filed: Apr. 30, 2012

(51) Int. Cl.
*H04N 7/10* (2006.01)
*H04N 7/16* (2006.01)
*H04N 7/025* (2006.01)

(52) U.S. Cl.
USPC .............................. 725/36; 725/32; 725/144

(58) Field of Classification Search
USPC ............................................. 725/32, 36, 144
See application file for complete search history.

(56) References Cited

U.S. PATENT DOCUMENTS

| | | | |
|---|---|---|---|
| 5,512,934 A * | 4/1996 | Kochanski | 725/97 |
| 8,151,295 B1 * | 4/2012 | Eldering et al. | 725/34 |
| 2002/0083442 A1 * | 6/2002 | Eldering | 725/34 |
| 2002/0112249 A1 * | 8/2002 | Hendricks et al. | 725/136 |
| 2003/0070167 A1 * | 4/2003 | Holtz et al. | 725/32 |

* cited by examiner

*Primary Examiner* — Dominic D Saltarelli
(74) *Attorney, Agent, or Firm* — Lowenstein Sandler LLP

(57) ABSTRACT

A computer implemented method and system for managing redundant signals are disclosed. At least one server receives a first signal stream with an identifier, the first signal stream having a first time associated with a first signal point. The at least one server receives a second signal stream with the identifier, the second signal stream having a second time associated with a second signal point, wherein the second time is after the first time. The at least one server compares the first time associated with the first signal stream with the second time associated with the second signal stream. The at least one server terminates transmission of the second signal stream and transmits the first signal stream when the comparison is determined to be within a time range tolerance. Both signal streams are transmitted when the comparison is determined not to be within a time range tolerance.

19 Claims, 10 Drawing Sheets

METHOD FOR INGESTING MULTIPLE SIGNALS OF THE SAME MEANING

FIELD OF THE INVENTION

The present invention relates generally to service provider video networks, and more particularly to a method and system for managing redundant signals.

BACKGROUND OF THE INVENTION

Traditionally, programming of broadcast and cable television and radio, including content (i.e., the video or audio program) and (the placement of) ads in a video or audio signal stream, has followed a linear model. Programming may be linear in the sense that a program begins and is streamed and in progress when a user chooses to view entertainment content. FIG. 1 illustrates a conventional linear or video-on-demand (VOD) model for advertisement placement. Entertainment content 2, when processed as a digital data stream over a cable network, may be divided into a number of time intervals. The time intervals 4 include time reserved for a viewed program (content), such as "Golden Girls." The intervals 6, 8, 10, represent sections of time reserved for advertisements or "avails." These "avails" may be viewed as advertisement placement opportunities. As used herein, a "placement opportunity" was traditional called an avail and is sometimes referred to as a slot (spots into slots). A placement opportunity (PO) is a construct that represents an opportunity to insert an advertisement or entertainment content, and defines the rules for that opportunity, such as its duration, interactivity, ownership, and technical constraints.

As used herein, the term "binding" refers to an identification of signals and content within a placement opportunity (PO). PO's are frequently created for broad amounts of content that are not yet published (i.e., any show on TNT network in the evening). When the show airs and a signal is detected, the signal is bound to the relevant PO's for that show.

As used herein, the term "impression" refers to a showing of an advertisement to a single viewer. For example, if a 30 second spot is placed in 50,000 video-on-demand (VOD) streams and it is known that 30,000 of the streams actually played the ad, then 30,000 impressions of that advertisement have been generated.

As used herein, a "status notification" may be, but is not limited to, an HTTP call from a VOD server with a unique ID that was created when a decision was delivered.

As used herein, the term "break" refers to all of the space in a stream between entertainment content. For example, a group of 4 consecutive 30 second spots between 2 segments of "Two and a Half Men" may be considered as a single break.

As used herein, an estimated starting location of a break in a source signal stream is referred to as a signal point. In the context of advertisement placement, these signal points may be referred to as advertisement signal points.

In non-linear systems, such as Video-on-Demand (VOD), the intervals 6, 8, 10 may take on new meanings. The interval 6 is called a pre-roll, i.e., the space in a video that occurs immediately after a user clicks to start a VOD video. The interval 10 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. VOD advertisement placement opportunities may appear based on space, time, content, and user context and may be highly non-linear (i.e., the user chooses to initiate the playing of content and in response, the content starts). All of the intervals 6, 8, 10 in such play lists are ripe for the insertion of advertisements, i.e., advertisement placement opportunities.

FIG. 2 depicts a configuration of a conventional Internet-based cable television infrastructure 200 for performing advertising placement decisions in signal streams. On TV, the advertising network was formerly the national network, the cable network, or the cable operator. However, unlike the Internet, where browsers access/display content and then are separately "referred" to a shared advertisement network, the Internet-based cable television infrastructure 200 selects and assembles both the advertisement and the content together and delivers the combined result to customers' "smart appliances" 202a-202n (e.g., Internet ready televisions, radios, smartphones, tablets, PCs, etc.).

Recently, smart appliances 202a-202n, such as Internet-ready televisions, have become capable of receiving content from Internet streaming services, such as Netflix movies, Pandora streaming radio, etc., over WiFi or direct Ethernet connections. When a user clicks on an icon for an "app" that appears on the television set corresponding to one of these services, the content is streamed to the smart appliance 202a-202n from a content delivery network (CDN) 204 directly to the application running in the smart appliance 202a-202n without the need for a set top box.

A set top box may be configured to decode an analog representation of two states of a digital signal, as is known in the art, that is continuously streamed and pushed to the set top box through a broadcast facility over a coaxial or fiber optic cable and the set top box tunes to that channel and displays the content. When a user watches Internet-delivered program content, a browser within the smart appliance 202a-202n fetching video in predetermined time chunks—generally two sometimes three, sometimes ten second chunks. The fetched chunks of video are seamlessly stitched together dynamically in the app software and then displayed so as to appear as a smooth video on the smart appliance 202a-202n.

A Multiple System/Service Operator (MSO—a cable TV organization that owns more than one cable system and may prove broadband Internet service) may wish to rebroadcast video streams on smart appliances. Unfortunately, every connected device, including smart appliances, needs to obtain video in the format that it can consume. Apple, Microsoft, Adobe, etc., have very specific and incompatible formats. To overcome this problem, each of these companies has constructed facilities called content deliver networks (CDN) 204 where a "set top box" for each channel is configured to receive broadcasts from satellites. A signal received by a "set top box" from upstream devices 206 is fed to a transcoder 208 to place the signal in a desired format and to fragment the formatted signal into the predetermined (e.g., 2 second) chunks of data. These chunks are then stored at the CDN 204 on server farms located physically close to where the content is to be delivered.

To identify a particular channel data stream, including times when a program has ended (i.e., an advertisement signal point) and before the next program begins, i.e., a placement opportunity, a q-tone is inserted in the digital stream a predetermined time before the next program begins. The q-tone may be an instance of an SCTE-35 packet. An observer 210, which may be the transcoder 208, informs an advertisement service (ADS) 212 of the arrival of the q-tone for subsequent placement of one or more advertisements into the channel data stream beginning at an advertisement signal point. The advertisement service 212, in turn, is waiting for the subsequent arrival of requests from a CDN 204 to place advertisements into advertisement breaks beginning at an advertisement signal point in the channel data stream.

An MSO prefers to prevent system and therefore signal outages that may originate, for example, an outage of power in a data center. To overcome this problem, the MSO may provide two or more observers of the same signal stream. The MSO may provide for redundant copies of q-tones and signal stream representative of the same channel content and corresponding advertisement signal points within one office, replicated in more than one office at separate locations, or both.

Unfortunately, multiple observers in different data centers may be geographically separate by large distances. As a result, two or more q-tones representative of the same advertisement signal point in the same or redundant signal streams may differ in arrival time to such a degree that one signal point may be indistinguishable from the next advertisement signal point. It becomes increasingly probable that the wrong placement opportunity may be bound to two or more signals having the same meaning.

Conversely, having redundant q-tones that are received at about the same time for the same advertisement signal point in multiple redundant signal streams is wasteful of system resources. The MSO would likewise not desire to have multiple sets of equipment to which bind multiple copies of the same placement opportunity.

Therefore, what is desirable, but has not been provided, is a method and system for eliminating resource redundancy in signal streams of the same meaning (i.e., having the same content and ad breaks) by accurately identifying and distinguishing between two or more advertisement breaks that are representative of the same or different advertisement signal points.

SUMMARY OF THE INVENTION

The above-described problems are addressed and a technical solution is achieved in the art by providing a computer implemented method and system for managing redundant signals. At least one server receives a first signal stream with an identifier, the first signal stream having a first time associated with a first signal point. The at least one server receives a second signal stream with the identifier, the second signal stream having a second time associated with a second signal point, wherein the second time is after the first time. The at least one server compares the first time associated with the first signal stream with the second time associated with the second signal stream. The at least one server terminates transmission of the second signal stream and transmits the first signal stream when the comparison is determined to be within a time range tolerance. Both signal streams are transmitted when the comparison is determined not to be within a time range tolerance.

In one embodiment, the comparison may be based on a function. The function may comprise rounding the first time S1 to a nearest multiple of a base time interval N offset from 0 seconds, determining a remainder R1 of the first time with S1, and storing R1, R1−N, and R1+N in a data store. Comparing the first time associated with the first signal stream with the second time associated with the second signal stream may comprise: rounding the second time S2 to a nearest multiple N; determining a remainder R2 of the second time with S2; comparing R2, R2−N, and R2+N with at least one of R1, R1−N, and R1+N; determining the comparison to be within the time range tolerance if any of R2, R2−N, and R2+N matches any of (or at least one of) R1, R1−N, and R1+N; otherwise, determining the comparison to be not to be within the time range tolerance.

In an embodiment, the data store may be a shared memory. The shared memory may be shared across multiple processes. In another embodiment, the data store may be a topic. When there are multiple servers operating over multiple sites, the topic may be a cross-site channel topic.

In an embodiment, when a cross-site channel topic is employed, receiving the first signal stream further comprises posting the identifier and R2, R2−N, and R2+N in a first message to the cross-site channel topic. The first signal stream may be transmitted when the first message is received from the cross-site channel topic. The comparison of R2, R2−N, and R2+N with R1, R1−N, and R1+N above may be carried out when a second message is received before the first message is received from the cross-site channel topic.

In an embodiment, the second signal stream may be unconditionally transmitted when a programmed computer of the at least one programmed computer associated with the first signal stream is down.

In an embodiment, processing may switch between transmitting the first signal stream and transmitting the second signal stream to balance a notification load between the first signal stream and the second signal stream.

In an embodiment, receiving a first signal and receiving a second signal stream may further comprise identifying, using the at least one programmed computer, the first advertisement signal point in the first signal stream and identifying, using the at least one programmed computer, the second advertisement signal point the second signal stream; and associating the first time with the first advertisement signal point in the first signal stream and associating the second time with the second advertisement signal point in the second signal stream. Associating a first time with the first advertisement signal point in the first signal stream may comprise determining a first temporal starting location of the first advertisement signal point in the first signal stream. Associating a second time with the advertisement signal point in the second signal stream may comprise determining a second temporal starting location of the second advertisement signal point in the second signal stream.

In an embodiment, determining a first temporal starting location of the first advertisement signal point in the first signal stream may be based on noting a first wall clock time after receiving a first instance of an SCTE-35 packet indicative of a cue tone associated with the first signal stream. Determining a second temporal starting location of the second advertisement signal point in the second signal stream may be based on noting a second wall clock time after receiving a second instance of an SCTE-35 packet indicative of a cue tone associated with the second signal stream.

In an embodiment, the first time and the identifier may be transmitted to a data store and the second time and the identifier may be transmitted to the data store.

In an embodiment, least one theoretical advertisement placement opportunity may be generated based on the first (or second) advertisement signal point. At least one confirmed advertisement placement opportunity may be obtained from the at least one theoretical advertisement placement opportunity. Obtaining the at least one confirmed advertisement placement opportunities may be obtained from the at least one theoretical advertisement placement opportunity may comprise: pre-allocating at least one premade, but unconfirmed advertisement placement opportunity without signals; binding the first signal stream to at least one premade, but unconfirmed advertisement placement opportunity; and updating the at least one premade, but unconfirmed advertisement placement opportunity as confirmed advertisement placement opportunity.

In an embodiment, at least one interested and permitted registrant may be identified for receiving a notification of the confirmed advertisement placement opportunity. A notification of the confirmed advertisement placement opportunity may be sent to at least one advertisement service associated with at least one identified interested and permitted registrant.

BRIEF DESCRIPTION OF THE DRAWINGS

The present invention will be more readily understood from the detailed description of exemplary embodiments presented below considered in conjunction with the attached drawings, of which.

Figure 1:
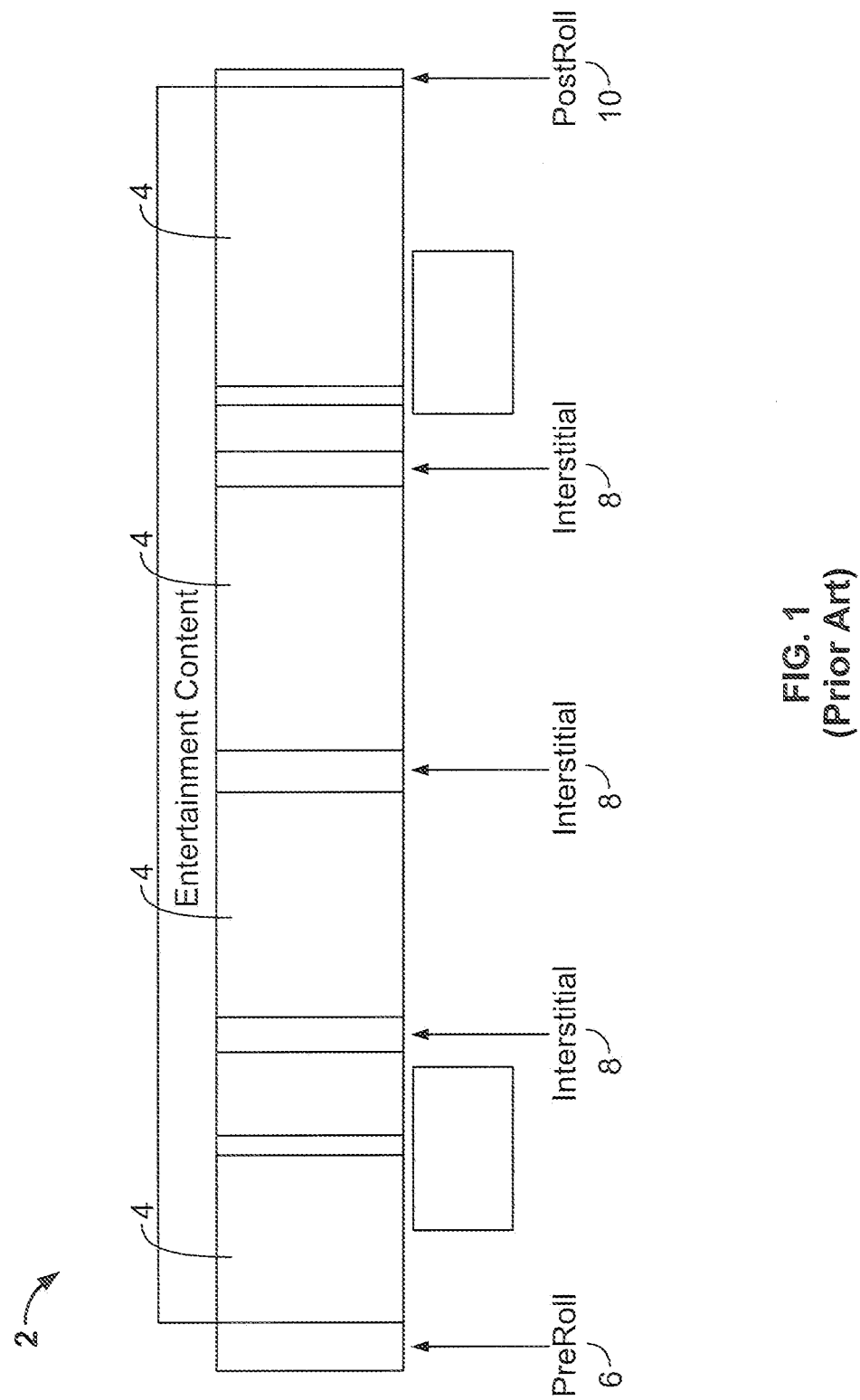
FIG. 1 illustrates a conventional linear or video-on-demand (VOD) model for advertisement placement.
Figure 2:
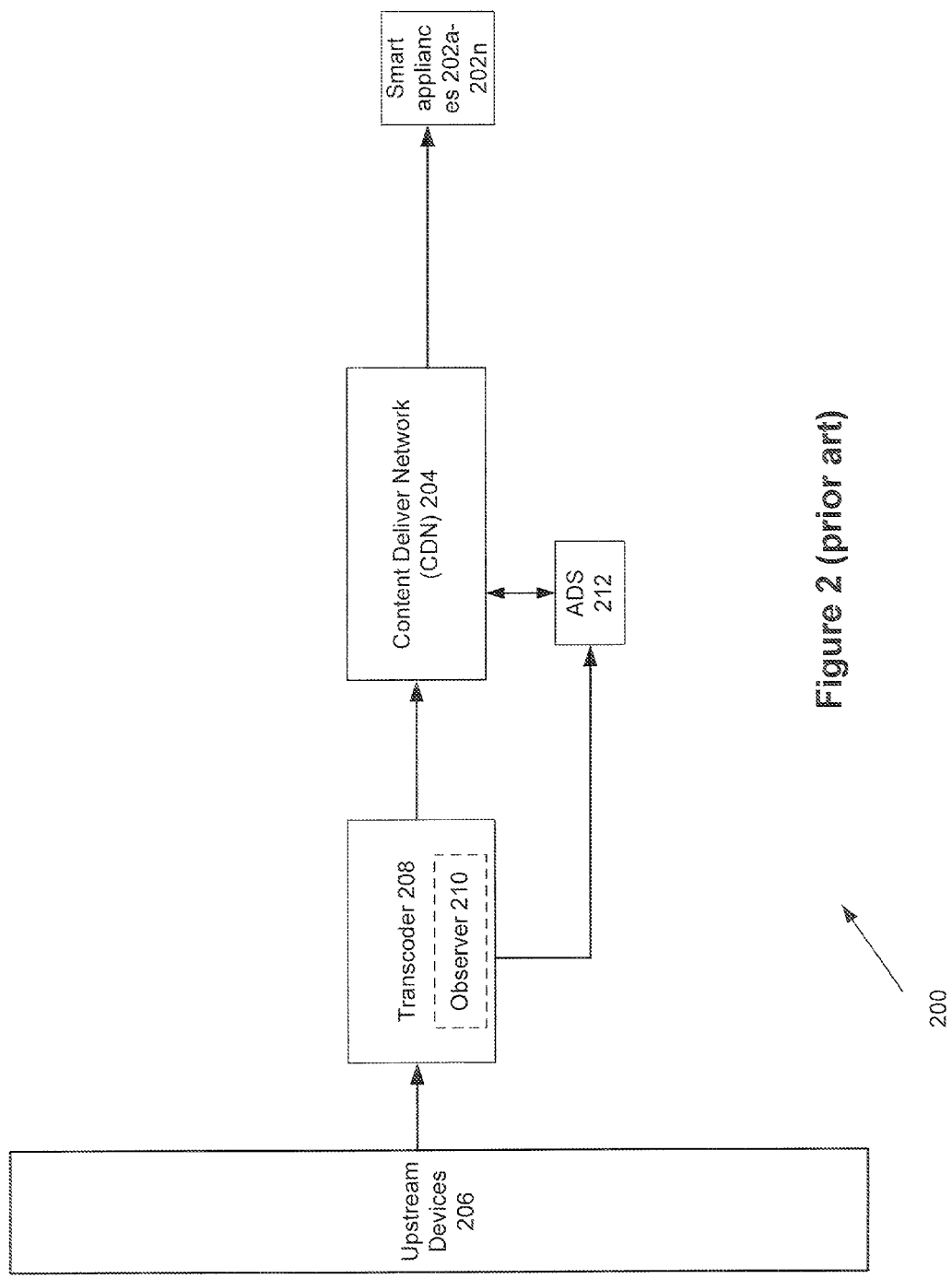
FIG. 2 depicts a configuration of a conventional Internet-based cable television infrastructure for performing advertising placement decisions in signal streams.

It is to be understood that the attached drawings are for purposes of illustrating the concepts of the invention and may not be to scale.

DETAILED DESCRIPTION OF THE INVENTION

Certain embodiments of the present invention are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as advertisement rotation groups (rotation groups refer to placement opportunities that run in rotation so that the same ad is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces The SCTE-130 standard defines a set of logical services comprising an advanced advertising system. Each logical service may itself be a complex system. In an embodiment, one or more of the following logical services may be used by or interact with certain embodiments of the present invention.

An Advertisement Management Service (ADM) defines messages in support of advertisement insertion activities. The primary consumer of these messages is an Advertisement Decision Service (ADS). The message interfaces exposed by an ADM permit both pre-configured advertisement decisions as well as real-time fulfillment models. An ADM implementation may incorporate some simple advertisement selection rules (e.g., advertisement rotations) but more complex advertisement decisions are the responsibility of an ADS.

An Advertisement Decision Service (ADS) determines how advertising content is combined with non-advertising (i.e., entertainment) content assets. The decisions made by an ADS may be straightforward (i.e., specific advertisement content placed at a specific time in a specific asset) or arbitrarily complex (based on subscriber data, advertising zone, etc.).

A Content Information Service (CIS) manages metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) is a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Advertisement Decision Service (ADS) to retrieve and utilize content metadata in their advanced advertising decision processing.

A Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS is a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Advertisement Decision Service (ADS) can retrieve and utilize placement opportunity metadata in their advanced advertising decision making.

The Subscriber Information Service (SIS) manages per-subscriber information relevant to advertisement placement decisions. The SIS provides a mapping between subscriber or client identifiers, such as a MAC address, serial number, etc., and subscriber or audience attributes, e.g., age, sex, location of a subscriber.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 10), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 3:
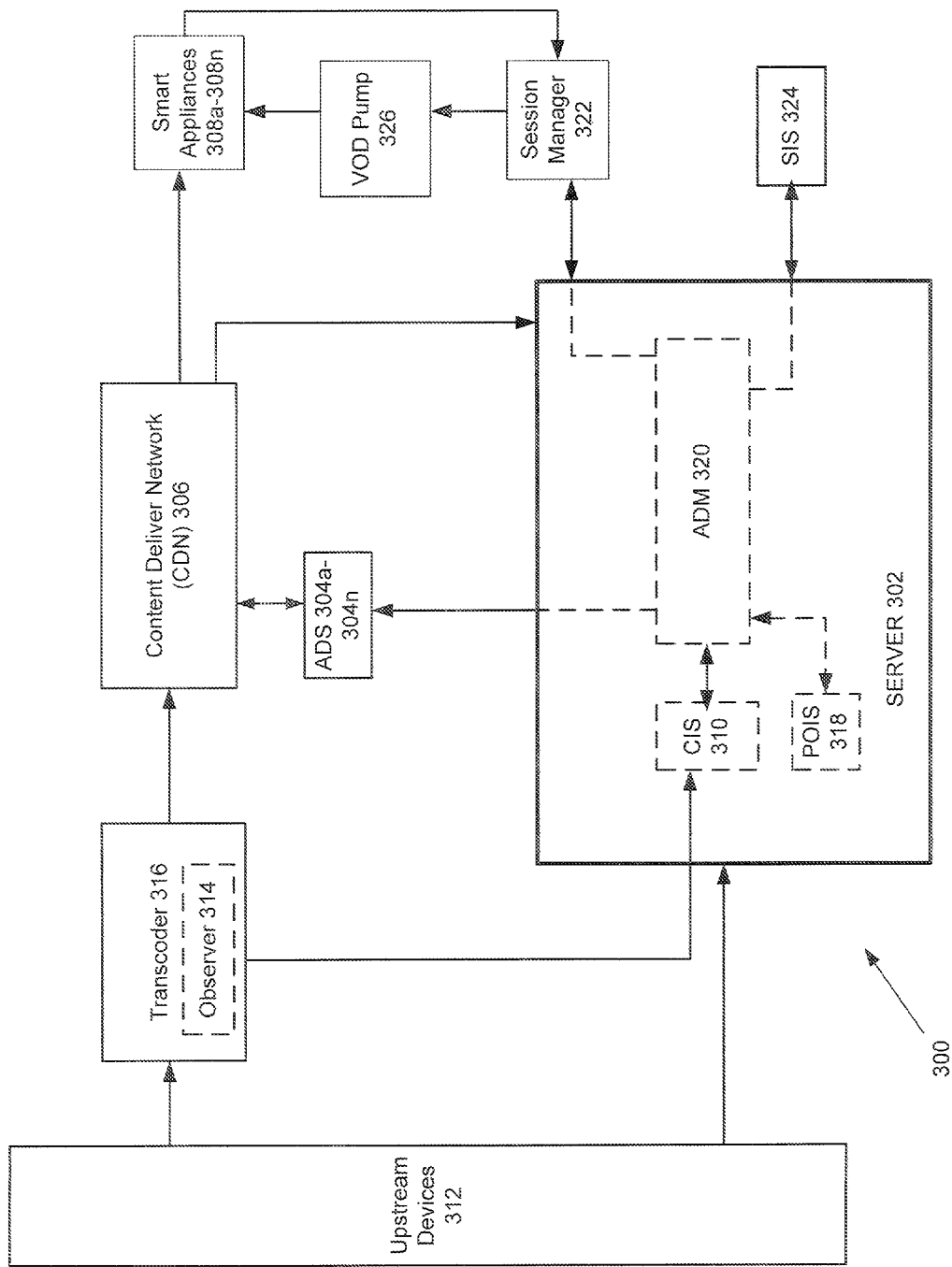
FIG. 3 depicts a configuration of a system for processing one or more live linear signal streams in one MSO equipment office, according to an embodiment of the present invention.

FIG. 3 depicts a configuration of a system 300 for processing one or more live linear signal streams in one MSO equipment office, according to an embodiment of the present invention. The system 300 may be executed on a server 302, interconnected by one or more networks (not shown) and communicatively connected to one or more ADSs 304a-304n. The ADSs 304a-304n are configured to place advertisements into advertisement signal points in recipient data streams at the request of a CDN 306 for delivery to one or more smart appliances 308a-308n.

The server 302 may be associated with or implement a CIS 310 for receiving one or more source signal streams from upstream devices 312 and corresponding q-tones (i.e., instances of SCTE-35 packets) from an observer 314, which may be incorporated within a transcoder 316. The transcoder 316 is also configured to deliver IP video, audio, etc. in predetermined "chunks" to a CDN 306 as described above.

The server 302 is configured to identify an advertisement signal point in the at least one source signal stream. In one embodiment, identifying an advertisement signal point in a signal source stream may be based on receiving an external notification of an arrival of the signal point in the corresponding source signal stream. The transcoder 316 associated with a specific vendor format for the source signal stream (e.g., TBS) receives the source signal stream and converts the source signal stream to IP video. In the process, the observer 314, which may be included in transcoder 316, notes the presence of an SCTE-35 q-tone.

In one embodiment, the notification is an instance of an SCTE-35 packet indicative of a q-tone tone prior to a corresponding signal point located in the source signal stream. The q-tone also provides an indication that a theoretical advertisement placement opportunity is located in the source signal stream a time period prior to a theoretical advertisement signal point in the source signal stream. The observer 314 of the transcoder 316 then places a web call to the CIS 310 to inform the CIS 310 that the q-tone for a specific channel identifier has been observed. The SCTE-35 packet and a channel identifier are identified from metadata of the source signal stream by the CIS 310 and delivered to the server 302.

The CIS 310 is also configured to identify metadata from the one or more source signal streams and the server 302 is configured to pre-allocate a corresponding number of unconfirmed placement opportunities without signals and to bind the source signal stream to a plurality of premade, but unconfirmed placement opportunities. Part of the identifier metadata includes a channel identifier associated with a corresponding source signal stream.

In one embodiment, a POIS 318 may be implemented by the server 302. The POIS 318 is configured to "confirm" unconfirmed placement opportunities by binding the source signal stream and metadata (i.e. assets) to a plurality of pre-made, but unconfirmed placement opportunities. More particularly, the server 302 determines a temporal starting location of the advertisement signal point in the at least one source signal stream. The temporal starting location of an advertisement signal point in the at least one source signal stream may be determined by the POIS 318 based on confirming theoretical placement opportunities located in the source signal stream. The temporal starting location of the advertisement signal point may be based in part on a wall clock time stamp.

The arrival of the SCTE-35 packet is an indication of a number of theoretical advertisement placement opportunities (POs) for the specified channel ID (e.g., TBS). Each unconfirmed PO has an estimated starting location known as an advertisement signal point. The advertisement signal point needs to be confirmed. When an actual advertisement insertion starting location is encountered in real-time in the source signal stream, a software process in the POIS 318 confirms the actual time of the advertisement signal point. This confirmed advertisement signal point results in the generation of confirmed POs that are now ready for advertisement insertion in at least one recipient signal stream.

When the POIS 318 receives the theoretical placement opportunities, the POIS 318 is configured to pre-allocate a corresponding number of unconfirmed advertisement placement opportunities without signals and to bind the source signal stream to a plurality of premade, but unconfirmed advertisement placement opportunities. Binding the source signal stream to a plurality of premade, but unconfirmed advertisement placement opportunities includes the CIS 310 identifying metadata including the channel identifier from the source signal stream. As used herein, the term "binding" refers to an identification of signals and content within a PO. PO's are frequently created for broad amounts of content that are not yet published (i.e., any show on TNT network in the evening).

When a show "airs" and a source signal stream is detected, the source signal stream is bound to the relevant PO's for that show.

As used herein, the term "binding" refers to an identification of signals and content within a PO. PO's are frequently created for broad amounts of content that are not yet published (i.e., any show on TNT network in the evening). Binding may include identifying temporal starting locations of the unconfirmed placement opportunities (i.e., including advertisement signal point(s)) relative to both the content stream and a wall clock. The POIS 318 then updates the plurality of premade, but unconfirmed advertisement placement opportunities as confirmed advertisement placement opportunities.

The POIS 318 is further configured to identify at least one interested and permitted registrant for receiving a notification of the confirmed advertisement placement opportunities. The POIS 318, via an ADM 320 (to be described below) is configured to send a notification of the confirmed advertisement placement opportunities to at least one advertisement service associated with at least one identified interested and permitted registrant.

In one embodiment, the POIS 318 may be configured to initiate a workflow in an instance of an SCTE 130 Advertisement Management Service 320, or ADM 320 associated with the server 302 to identify a list representative of a number of recipient signal streams having the channel identifier and at least one audience attribute. To identify the list, the ADM 320 places a call each to an external session manager 322 and an SIS 324. The ADM 320 transmits the channel identifier to the session manager 322, which provides the ADM 320 with a list of client identities indicative of a number of recipients currently viewing a channel corresponding to the channel identifier. The ADM 320 transmits the list of client identities and the channel identifier to the SIS 324 which provides the ADM 320 with a list of sets of audience qualifiers correlated to the client identities and the channel identifier. This list of sets of audience qualifiers correlated to the client identities and the channel identifier is representative of a list of recipient signal streams having the same channel identifier that are currently being "watched" by subscribers, where each subscriber in the list has a certain set of audience attributes (e.g., all males 21 and over). The ADM 320 is also configured to obtain a plurality of targeted advertisements corresponding to the list sets of audience qualifiers correlated to the client identities and the channel identifier from one or more of the ADSs 304a-304n. The ADM 320 receives, from the ADSs 304a-304n, the plurality of advertisements targeted to the list representative of the plurality of recipient signal streams.

The ADM 320 uses a unique signal ID (i.e., a UUID) plus a set of locally configured or learned targeting criteria to initiate a unique set of advertisement decision requests. The advertisement decision requests evolve into targeted advertisement decision requests to the appropriate decision owners (i.e., the ADSs 304a-304n) and the results are a set of advertisement placement decisions correlating to the placement opportunities generated as a result of signal confirmation.

Figure 4:
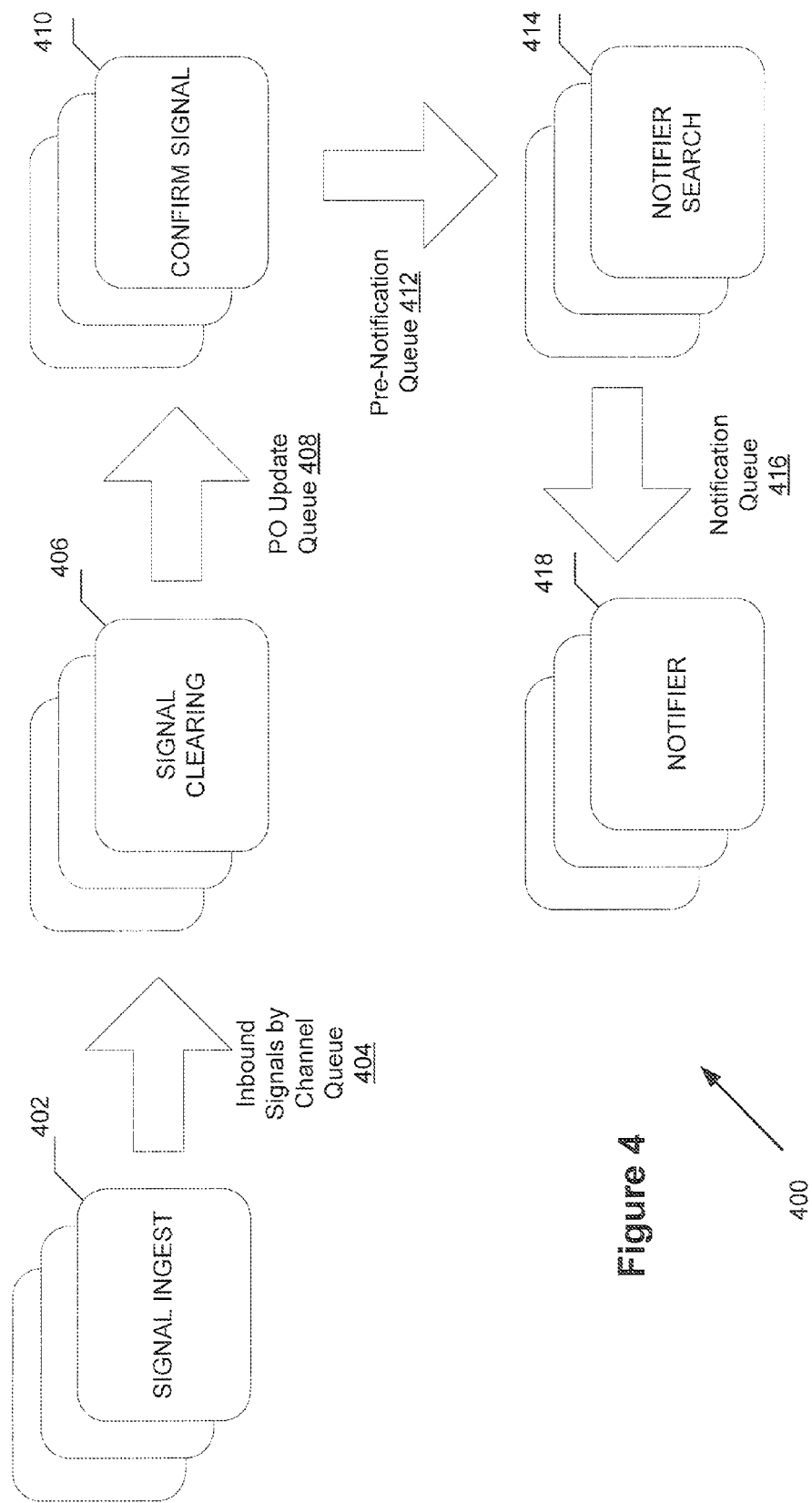
FIG. 4 illustrates one embodiment of a live linear placement opportunity (PO) processing queue architecture for processing a live linear placement opportunity (PO) from one source signal stream having one observer and one channel identifier.
Figure 5:
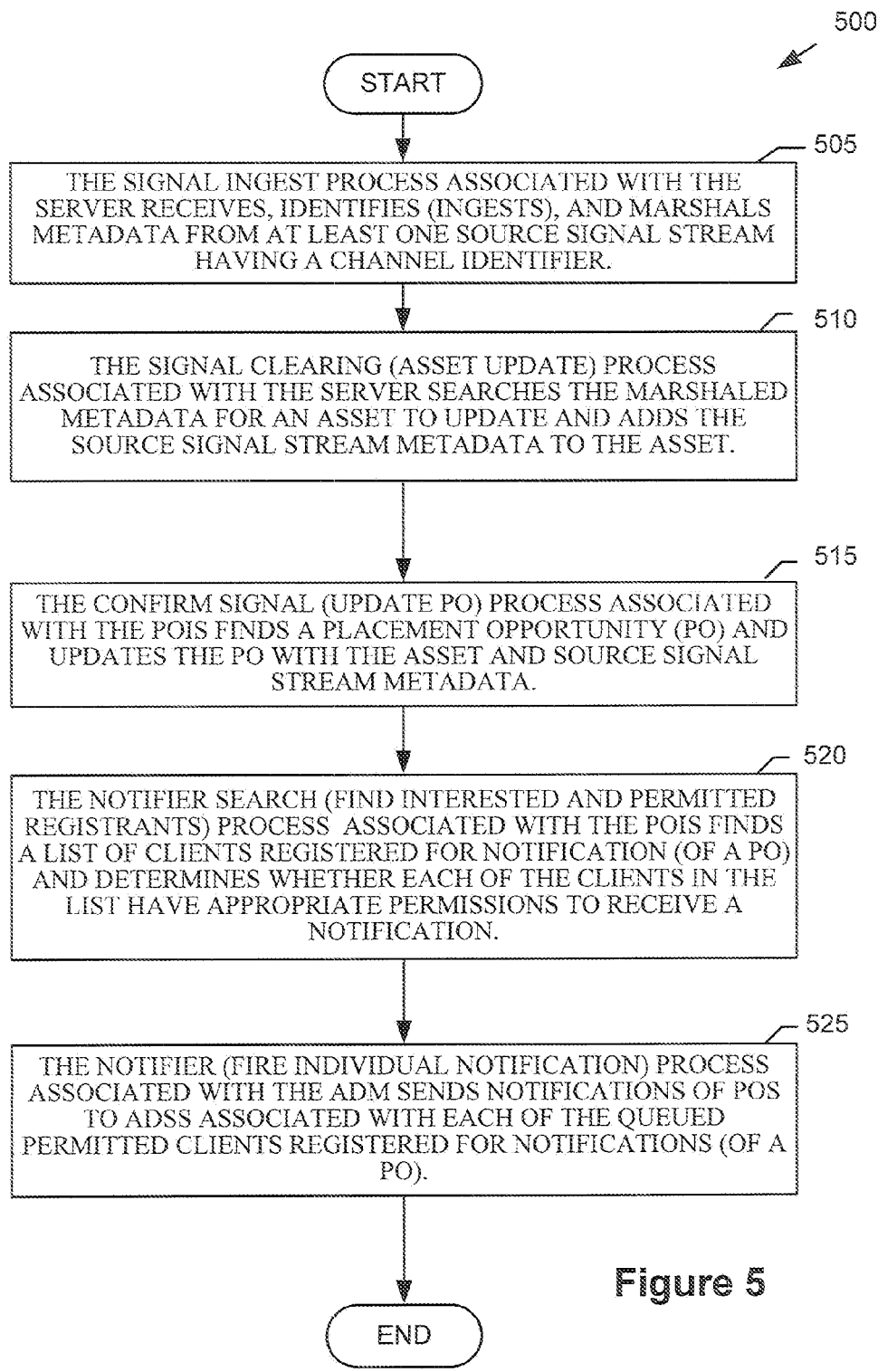
FIG. 5 is a flow diagram illustrating one embodiment of a method for processing a live linear placement opportunity (PO) from one source signal stream having one observer and one channel identifier.

FIG. 4 illustrates one embodiment of a linear placement opportunity (PO) processing queue architecture 400 for processing a linear placement opportunity (PO) from one source signal stream having one observer and one channel identifier. FIG. 5 is a flow diagram illustrating one embodiment of a method 500 for processing a linear placement opportunity (PO) from one source signal stream having one observer and one channel identifier. In FIG. 4, the blocks 402, 406, 410, 414, 418 are processes and the arrows 404, 408, 416 are queues. Each of the processes 402, 406, 410, 414, 418 may exist on multiple machines, or on the same machine (i.e., one or more machines associated with the server 302 of FIG. 3). A person skilled in the art would appreciate that the number of processes indicated in each task is not indicative of the required or optimal number of processes. More generally, a non-uniform number of processes may be apportioned across tasks. Because the first and last task (signal ingest 402 and notifier 418) are stateless (i.e., they only process what is on a queue in front of or behind them), they may span multiple channel groups. The three middle tasks 406, 410, 414 define a channel group as a state of assets, signals, and PO's that may be shared across tasks made possible by employing a shared memory that works across machines. Thus, if the variable x is associated with the value 3 on computer A, computer B may see that x=3.

Referring now to FIGS. 4 and 5, at block 505, the signal ingest process 402 associated with the server 302 receives, identifies, and marshals metadata (ingests) from at least one source signal stream having a channel identifier. The CIS 310 associated with the server 302 receives a source signal stream (e.g., in MPEG-2 format) having a channel identifier from the upstream devices 312. The CIS 310 extracts identifies from the source signal stream, marshals the metadata, and places the marshaled metadata into an appropriate channel group queue 404 associated with the server 302.

At block 510, the signal clearing (asset update) process 406 associated with the server 302 searches the marshaled metadata for an asset to update and adds the source signal stream metadata to the asset (which replicates to all instances of the processes 404). The updated asset as indicated by an asset ID and associated source signal stream metadata are passed to a PO update queue 408 in the POIS 318 associated with the server 302.

At block 515, the confirm signal (update PO) process 410 associated with the POIS 318 of the server 302 find a placement opportunity (PO) and updates the PO with the asset and source signal stream metadata. The asset and metadata are stored in a shared memory by POID. The POID and PAID are sent to a pre-notification queue 412 in the POIS 318.

At block 520, the notifier search (find interested and permitted registrants) process 414 associated with the POIS 318 of the server 302 find a list of clients registered for notification (of a PO) and determines whether each of the clients in the list have appropriate permissions to receive a notification. Registered and permitted clients are associated with an updated PO and placed into the notification queue 416 of the ADM 320 of the server 302.

At block 525, the notifier (fire individual notification) process 418 associated with the ADM 320 of the server 302 sends notifications of POs to ADSs 304a-304n associated with each of the queued permitted clients registered for notifications (of a PO).

Figure 6:
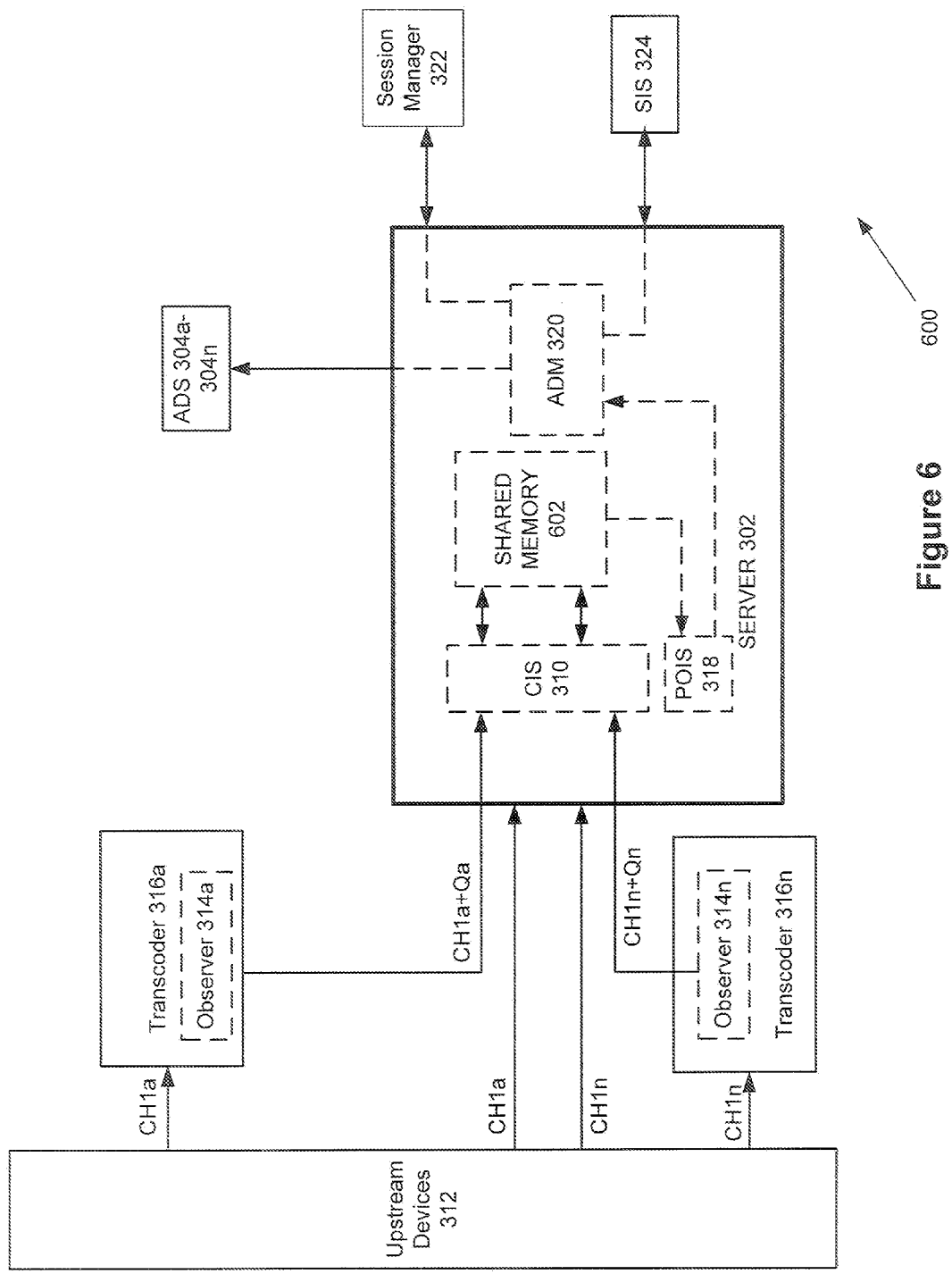
FIG. 6 depicts a configuration of one embodiment of a system for processing a live linear placement opportunity (PO) for redundant source signal streams having multiple observers and one channel identifier within the same data center.

FIG. 6 depicts a configuration of one embodiment of a system 600 for processing a linear placement opportunity (PO) for redundant source signal streams having multiple observers and one channel identifier within the same data center. FIG. 6 is similar to FIG. 3, except that the system 600 employs two or more signal observers 314a-314n within corresponding transcoders 316a-316n originating from multiple channels of the same meaning (i.e., having the same channel identifier, CH1a-CH1n) within the same data center for redundancy (in case one stream goes down). Corresponding transcoders 316a-316n are configured to insert SCTE-35 packets (q-tones) into their respective source signal streams (CH1a+Qa to CH1n+Qn) corresponding to the same advertisement signal point but which may arrive at different times at the CIS 310. However, it is necessary to alert downstream systems (e.g., the ADSs 304a-304n) of a single signal stream, either by only sending a single notification or sending multiple notifications with a matched signal from one source signal stream to the other source signal stream. This requires identifying and de-duplicating the source signal streams.

This may be accomplished by employing the shared memory 602. More particularly, the signal clearing process 406 of FIG. 4 and block 510 of FIG. 5 are modified to provide a comparator function for comparing a first time corresponding to a first signal point associated with the first signal stream (e.g., CH1a+Q1) with a second time corresponding to the same or different signal point associated with the second signal stream (e.g., CH1n+Qn). The second signal stream is terminated and the first signal stream is transmitted when the comparison is determined to be within a time range tolerance. Conversely, the first signal stream and the second signal stream are both transmitted when the comparison is determined not to be within a time range tolerance (i.e., indicative of different signal points).

Figure 7:
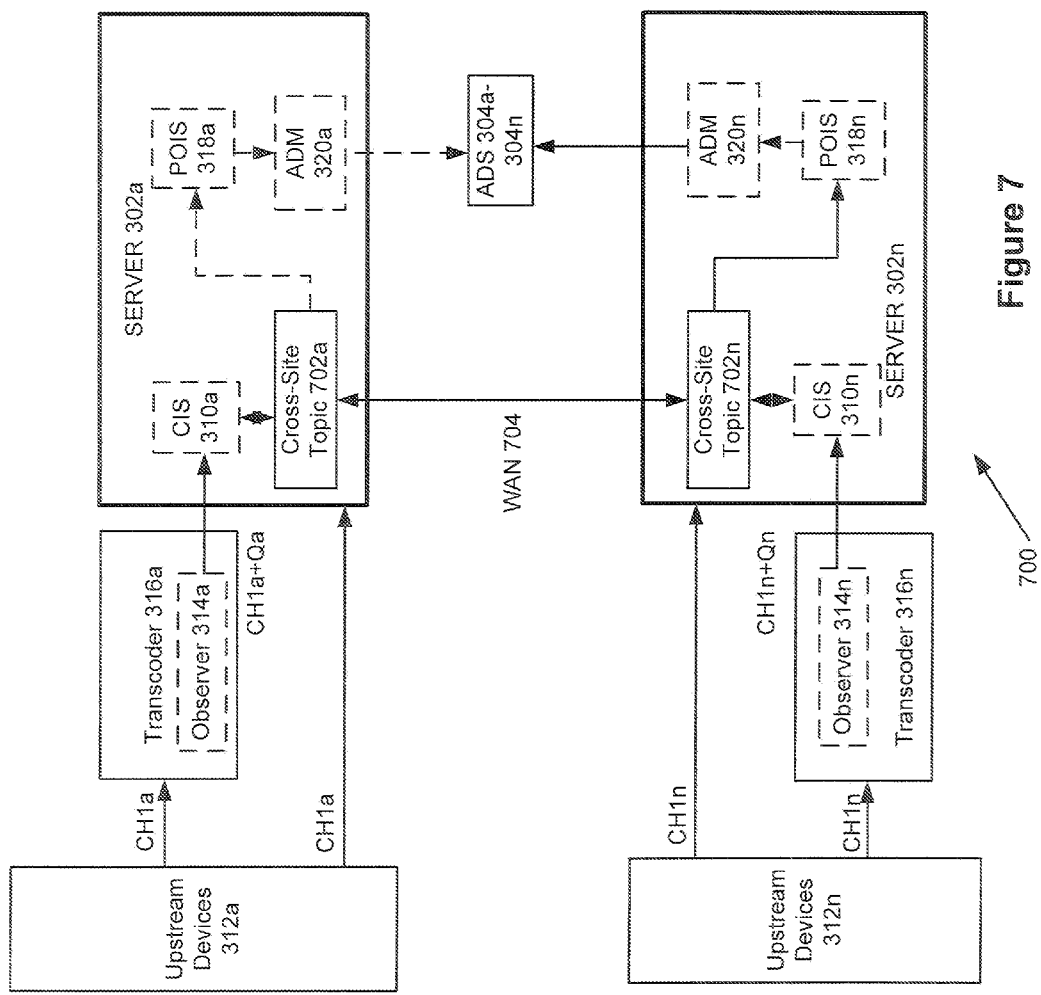
FIG. 7 depicts a configuration of one embodiment of a system for processing a live linear placement opportunity (PO) for redundant source signal streams having multiple observers and one channel identifier within different (i.e., redundant or protection) data centers.

FIG. 7 depicts a configuration of one embodiment of a system 700 for processing a linear placement opportunity (PO) for redundant source signal streams having multiple observers and one channel identifier within different (i.e., redundant or protection) data centers. FIG. 7 is similar to FIG. 3, except that the system 700 employs two or more signal observers 314a-314n within corresponding transcoders 316a-316n originating from multiple channels of the same meaning (i.e., having the same channel identifier, CH1a-CH1n) within multiple data centers for redundancy (in case an entire office goes down by, for example, losing power). Corresponding transcoders 316a-316n are configured to insert SCTE-35 packets (q-tones) into their respective source signal streams (CH1a+Qa to CH1n+Qn) corresponding to the same advertisement signal point but which may arrive at different times at multiple CISs 310a-310n associated with corresponding servers 302a-302n that additionally implement corresponding POISs 318a-318n and ADMs 320a-320n. Each of the servers 302a-302n may implement shared memories (not shown), but these shared memories may prove inadequate if the multiple data centers are widely separated. This may lead to corresponding signal points in corresponding redundant data streams arriving at widely separated times, resulting in a diagnosis of two or more of the same signal points as different signal points.

As with the system 600 of FIG. 6, it is necessary to alert downstream systems (e.g., the ADSs 304a-304n) of a single signal stream for the system 700 of FIG. 7, either by only sending a single notification or sending multiple notifications with a matched signal from one source signal stream to the other source signal stream. This requires identifying and de-duplicating the source signal streams.

This may be accomplished by employing a cross-site channel topic 702a-702n configured to operate between the multiple sites over a WAN 704 in each of the equipment offices. More particularly, the signal clearing process 406 of FIG. 4 and block 510 of FIG. 5 are modified such that an identifier (e.g., a channel ID and a stream name) as well as a first time of the first signal stream that arrives (e.g., CH1a+Qa) are posted in a first message to the cross-site channel topic 702a. If the first signal stream receives from the cross-site channel topic 702a the first message before receiving any other message, then the first signal stream its associated metadata are permitted to be transmitted to the POIS 318a while other redundant streams are terminated. If a second message (e.g., from CH1n+Qn) is received before the first message is received from the cross-site channel topic 702a, then the comparison function described below is employed to determine whether to permit the first signal stream or the second signal stream to be transmitted.

Figure 8:
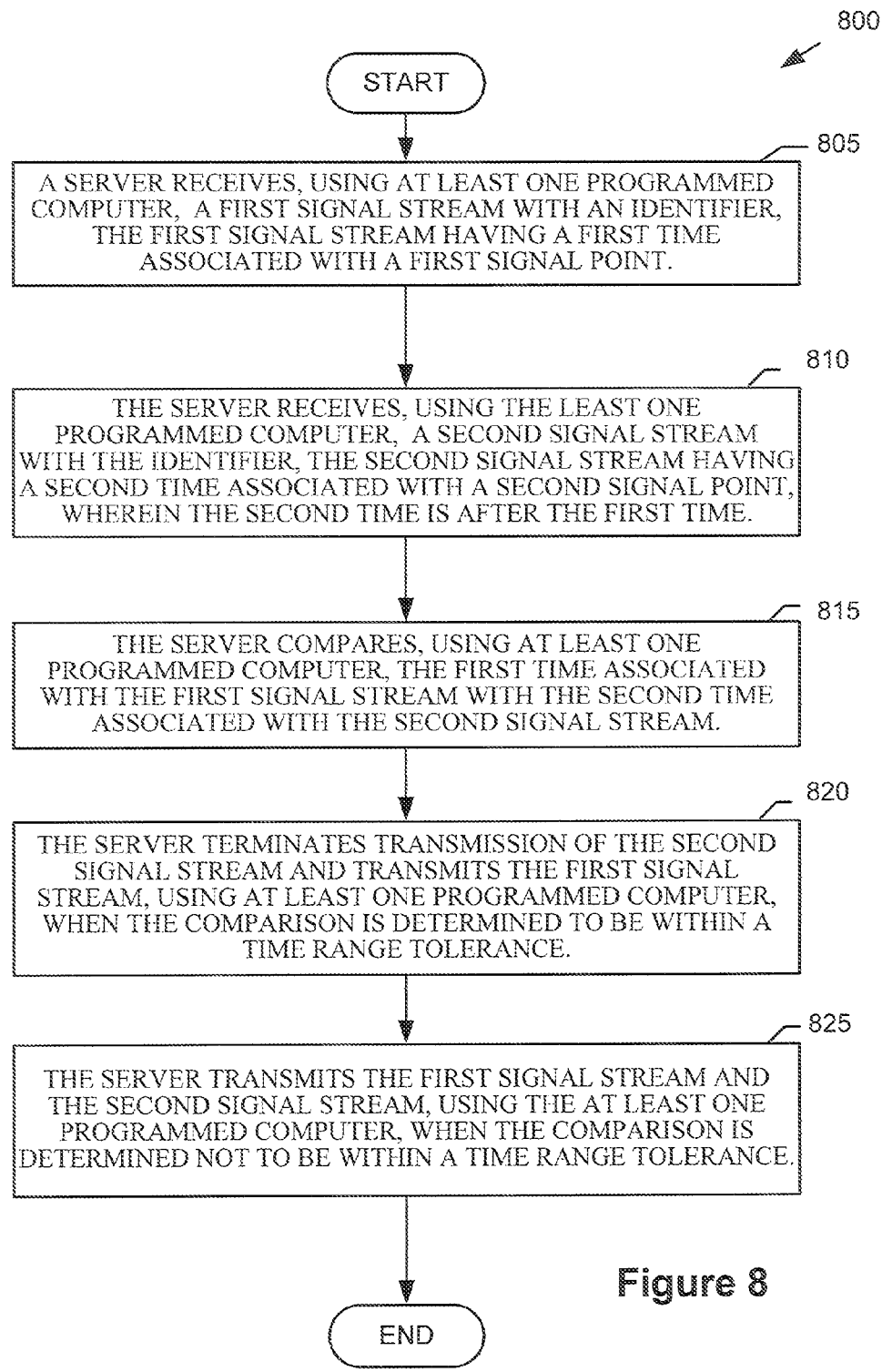
FIG. 8 is a flow diagram illustrating one embodiment of a method for managing redundant signals.

FIG. 8 is a flow diagram illustrating one embodiment of a method 800 for managing redundant signals. The method 800 is applicable both to the single office redundant system of FIG. 6 as well as the multi-office redundant system 700 of FIG. 7. At block 805, the server 302 (302a-302n) receives, using at least one programmed computer, a first signal stream with an identifier (e.g., CH1a+Qa). The first signal stream has a first time associated with a first signal point. At block 910, the server 302 (302a-302n) receives, using the at least one programmed computer, a second signal stream with an identifier (e.g., CH1n+Qn). The second signal stream has a second time associated with a second signal point. The second time may be identified as being after the first time. At block 815, the server 302 (302a-302n) compares, using the at least one programmed computer, the first time associated with the first signal stream with the second time associated with the second signal stream. At block 820, the server 302 (302a-302n) terminates transmission of the second signal stream and transmits the first signal stream, using the at least one programmed computer, when the comparison is determined to be within a time range tolerance. At block 825, the server 302 transmits the first signal stream and the second signal stream (i.e., to a downstream process, e.g., the ADSs 304a-304n), using the at least one programmed computer, when the comparison is determined not to be within a time range tolerance.

In an embodiment, the comparison, using the comparator function, may be performed during the execution of the signal clearing (asset update) process of step 510 of FIG. 5. More particularly, the comparator function includes a setup stage and a comparing stage. The setup stage for both the systems 600, 700 of FIGS. 6 and 7, respectively, include the following steps: The first time of arrival S1 of the first signal stream is rounded to a nearest multiple of a base time interval N offset from 0 seconds. A remainder R1 is determined of the first time with S1. R1, R1−N, and R1+N are stored in a data store. For the single site system 600 of FIG. 6, the values R1, R1−N, and R1+N, as well as a channel identifier, are stored in the shared memory 602. For the multi-site system 700 of FIG. 7, the values R1, R1−N, and R1+N, as well as a channel identifier and a stream name, are incorporated into a message with a message ID and posted to the cross-site channel topic 702a-702n.

The comparison stage compares values stored in the data store when the second signal stream with an associated second time is received and attempts to write to the data store. In such circumstances, for the single site system 600 of FIG. 6, the shared memory 602 is searched for the first channel identifier and first time. If not present, then the second signal stream may be transmitted to downstream processes. For the multi-site system 700 of FIG. 7, the server 302 (302a-302n) waits to receive a message from the cross-site channel topic 702a-702n. If the first posted message associated with the first signal stream returns before receiving another message with a different message ID, then the first signal stream is permitted to be transmitted to a downstream process. For the single site system 600 of FIG. 6, if the shared memory 602 returns the same channel ID and a second time, or for the multi-site system 700 of FIG. 7, the server 302 (302a-302n) subsequently receives another message with a different message ID, then the following steps are performed: The second time S2 is rounded to a nearest multiple N. A remainder R2 of the second time with S2 is determined. R2, R2−N, and R2+N are compared with at least one of R1, R1−N, and R1+N. Comparisons are made as to whether any of R2, R2−N, and R2+N matches any of (or at least one of) R1, R1−N, and R1+N. If there is a match, then the comparison is determined to be within the time range tolerance; otherwise, the comparison is determined to be not within the time range tolerance.

In an embodiment, the second signal stream may be unconditionally transmitted when a programmed computer of the at least one programmed computer associated with the first signal stream goes down. In another embodiment, unconditional switching between transmitting the first signal stream and transmitting the second signal stream may be performed to balance a notification load between the first signal stream and the second signal stream.

Figure 9:
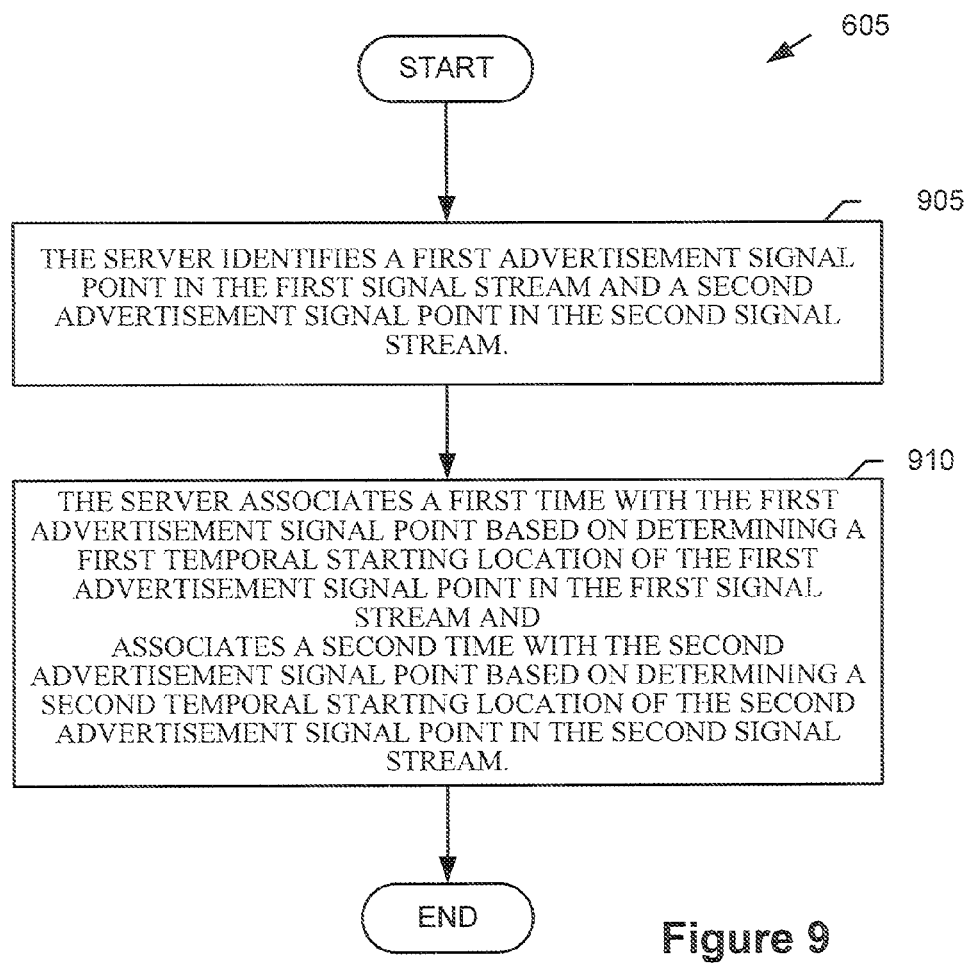
FIG. 9 is a flow diagram illustrating one embodiment of a method for receiving the first signal stream and receiving a second signal stream of FIG. 8 in greater detail.

FIG. 9 is a flow diagram illustrating one embodiment of a method 900 for receiving the first signal stream (Block 805) and receiving a second signal stream (Block 810) of FIG. 8 in greater detail. At block 905, the server 302 (302a-302n) identifies, using the at least one programmed computer, the first advertisement signal point in the first metadata of the first signal stream and identifies, using the at least one programmed computer, the second advertisement signal point in the second metadata of the second signal stream. At block 910, the server 302 (302a-302n) associates, using at least one programmed computer, the first time with the first advertisement signal point in the first signal stream and associates, using the at least one programmed computer, the second time with the second advertisement signal point in the second signal stream.

In an embodiment, associating a first time with the first advertisement signal point in the first signal stream may comprise determining a first temporal starting location of the first advertisement signal point in the first signal stream. Associating a second time with the advertisement signal point in the second signal stream may comprise determining a second temporal starting location of the second advertisement signal point in the second signal stream. Determining a first temporal starting location of the first advertisement signal point in the first signal stream may be based on noting a first wall clock time after receiving a first instance of an SCTE-35 packet indicative of a cue tone associated with the first signal stream. Determining a second temporal starting location of the second advertisement signal point in the second signal stream is based on noting a second wall clock time after receiving a second instance of an SCTE-35 packet indicative of a cue tone associated with the second signal stream.

In an embodiment, the server 302 (302a-302n) transmits, using the at least one programmed computer, the first time and the identifier to a data store and transmits, using the at least one programmed computer, the second time and the identifier to the data store. The data store is either the shared memory 602 of FIG. 6 or the cross-site channel topic 702a-702n of FIG. 7.

Figure 10:
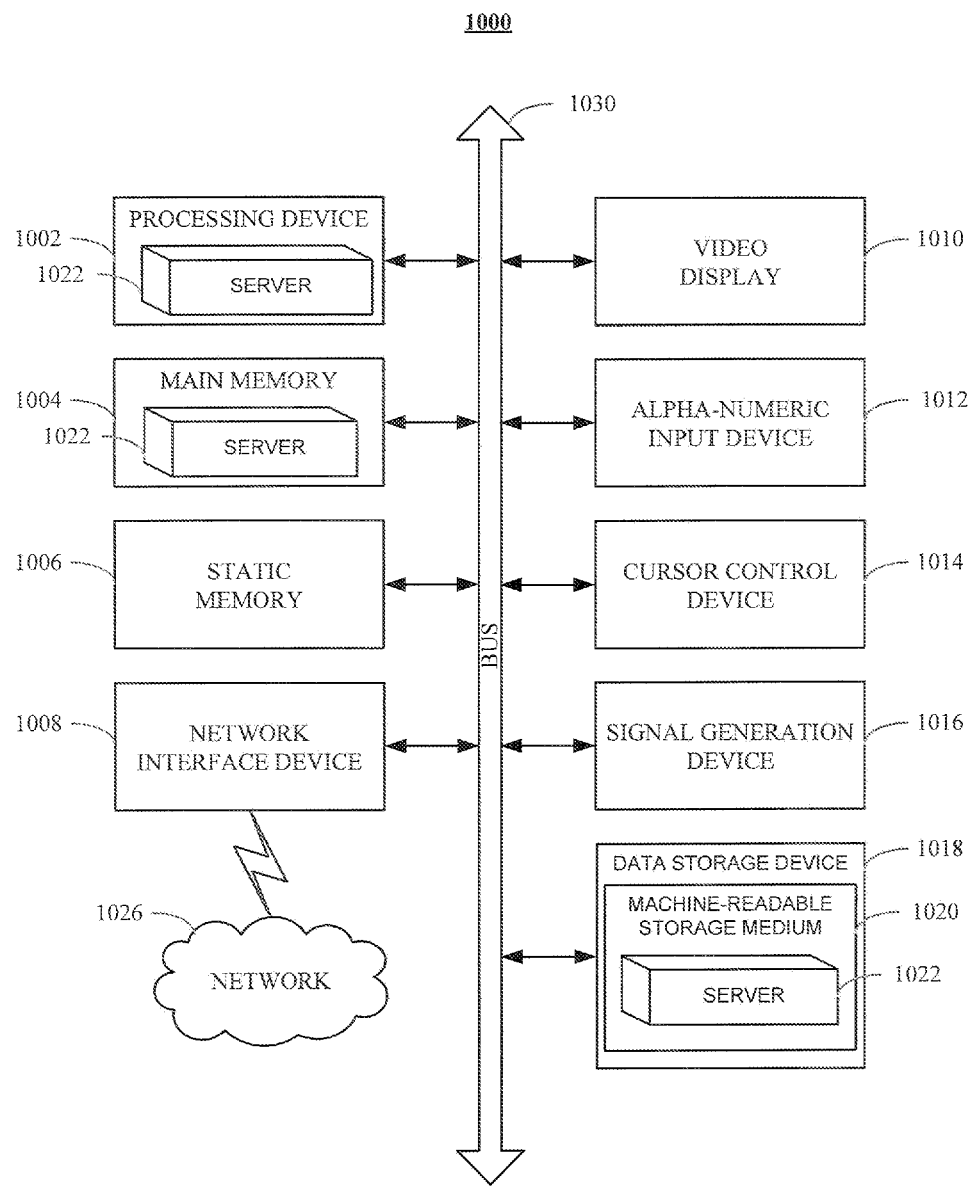
FIG. 10 illustrates a diagrammatic representation of a machine in the exemplary form of a computer system within which a set of instructions, for causing the machine to perform any one or more of the methodologies discussed herein, may be executed.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) (such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the server 302 (302a-302n).

Computer system 1000 may further include a network interface device 1008. Computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

Data storage device 1018 may include a machine-readable storage medium (or more specifically a computer-readable storage medium) 1020 having one or more sets of instructions 1022 (e.g., the server 302 (302a-302n)) embodying any one or more of the methodologies of functions described herein. The server 302 (302a-302n)) may also reside, completely or at least partially, within main memory 1004 and/or within processing device 1002 during execution thereof by computer system 1000; main memory 1004 and processing device 1002 also constituting machine-readable storage media. The server 302 (302a-302n)) may further be transmitted or received over a network 1026 via network interface device 1008.

Machine-readable storage medium 1020 may also be used to store the device queue manager logic persistently. While machine-readable storage medium 1020 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for managing redundant signals, said method comprising the steps of:
   receiving, using at least one programmed computer, a first multimedia signal stream with an identifier, the first multimedia signal stream having a first time associated with a first advertisement signal point;
   receiving, using at least one programmed computer, a second multimedia signal stream with the identifier, the second multimedia signal stream having a second time associated with a second advertisement signal point, wherein the second time is after the first time;
   comparing, using the at least one programmed computer, the first time associated with the first multimedia signal stream with the second time associated with the second multimedia signal stream; and
   terminating transmission of the second multimedia signal stream and transmitting the first multimedia signal stream, using the at least one programmed computer, when the comparison is determined to be within a time range tolerance.

2. The method of claim 1, further comprising transmitting the first signal stream and the second signal stream, using the at least one programmed computer, when the comparison is determined not to be within a time range tolerance.

3. The method of claim 2, wherein the comparison is based on a function.

4. The method of claim 1, further comprising, unconditionally transmitting the second signal stream when a programmed computer of the at least one programmed computer associated with the first signal stream is down.

5. The method of claim 1, further comprising switching between transmitting the first signal stream and transmitting the second signal stream to balance a notification load between the first signal stream and the second signal stream.

6. The method of claim 1, further comprising:
   identifying, using the at least one programmed computer, the first advertisement signal point in the first signal stream and
   identifying, using the at least one programmed computer, the second advertisement signal point in the second signal stream.

7. The method of claim 6, further comprising:
   associating, using at least one programmed computer, the first time with the first advertisement signal point in the first signal stream and
   associating, using the at least one programmed computer, the second time with the second advertisement signal point in the second signal stream.

8. The method of claim 7,
   wherein associating a first time with the first advertisement signal point in the first signal stream comprises determining a first temporal starting location of the first advertisement signal point in the first signal stream and
   wherein associating a second time with the advertisement signal point in the second signal stream comprises determining a second temporal starting location of the second advertisement signal point in the second signal stream.

9. The method of claim 8,
   wherein determining a first temporal starting location of the first advertisement signal point in the first signal stream is based on noting a first wall clock time after receiving a first instance of an SCTE-35 packet indicative of a cue tone associated with the first signal stream and
   wherein determining a second temporal starting location of the second advertisement signal point in the second signal stream is based on noting a second wall clock time after receiving a second instance of an SCTE-35 packet indicative of a cue tone associated with the second signal stream.

10. The method of claim 7, further comprising:
transmitting, using the at least one programmed computer, the first time and the identifier to a data store and
transmitting, using the at least one programmed computer, the second time and the identifier to the data store.

11. The method of claim 1, further comprising generating at least one theoretical advertisement placement opportunity based on the first advertisement signal point.

12. The method of claim 11, further comprising obtaining at least one confirmed advertisement placement opportunity from the at least one theoretical advertisement placement opportunity.

13. The method of claim 12, wherein obtaining the at least one confirmed advertisement placement opportunities from the at least one theoretical advertisement placement opportunity comprises:
pre-allocating at least one premade, but unconfirmed advertisement placement opportunity without signals;
binding the first signal stream to at least one premade, but unconfirmed advertisement placement opportunity; and
updating the at least one premade, but unconfirmed advertisement placement opportunity as confirmed advertisement placement opportunity.

14. The method of claim 13, further comprising identifying at least one interested and permitted registrant for receiving a notification of the confirmed advertisement placement opportunity.

15. The method of claim 14, further comprising sending a notification of the confirmed advertisement placement opportunity to at least one advertisement service associated with at least one identified interested and permitted registrant.

16. A computer system for managing redundant signals, comprising:
a memory;
a processing device, coupled to the memory, the processing device configured to:
receive a first multimedia signal stream with an identifier, the first signal stream having a first time associated with a first advertisement signal point;
receive a second multimedia signal stream with the identifier, the second multimedia signal stream having a second time associated with a second advertisement signal point, wherein the second time is after the first time;
compare the first time associated with the first multimedia signal stream with the second time associated with the second multimedia signal stream; and
terminate transmission of the second multimedia signal stream and transmit the first multimedia signal stream when the comparison is determined to be within a time range tolerance.

17. The system of claim 16, wherein the processing device is further configured to transmit the first signal stream and the second signal stream when the comparison is determined not to be within a time range tolerance.

18. A non-transitory computer readable storage medium including instructions that, when executed by a processing system, cause the processing system to perform a method for managing redundant signals, comprising:
receiving a first multimedia signal stream with an identifier, the first multimedia signal stream having a first time associated with a first advertisement signal point;
receiving a second multimedia signal stream with the identifier, the second signal stream having a second time associated with a second advertisement signal point, wherein the second time is after the first time;
comparing the first time associated with the first multimedia signal stream with the second time associated with the second multimedia signal stream; and
terminating transmission of the second multimedia signal stream and transmitting the first multimedia signal stream when the comparison is determined to be within a time range tolerance.

19. The non-transitory computer readable storage medium of claim 18, further comprising transmitting the first signal stream and the second signal stream when the comparison is determined not to be within a time range tolerance.

* * * * *